United States Patent Office.

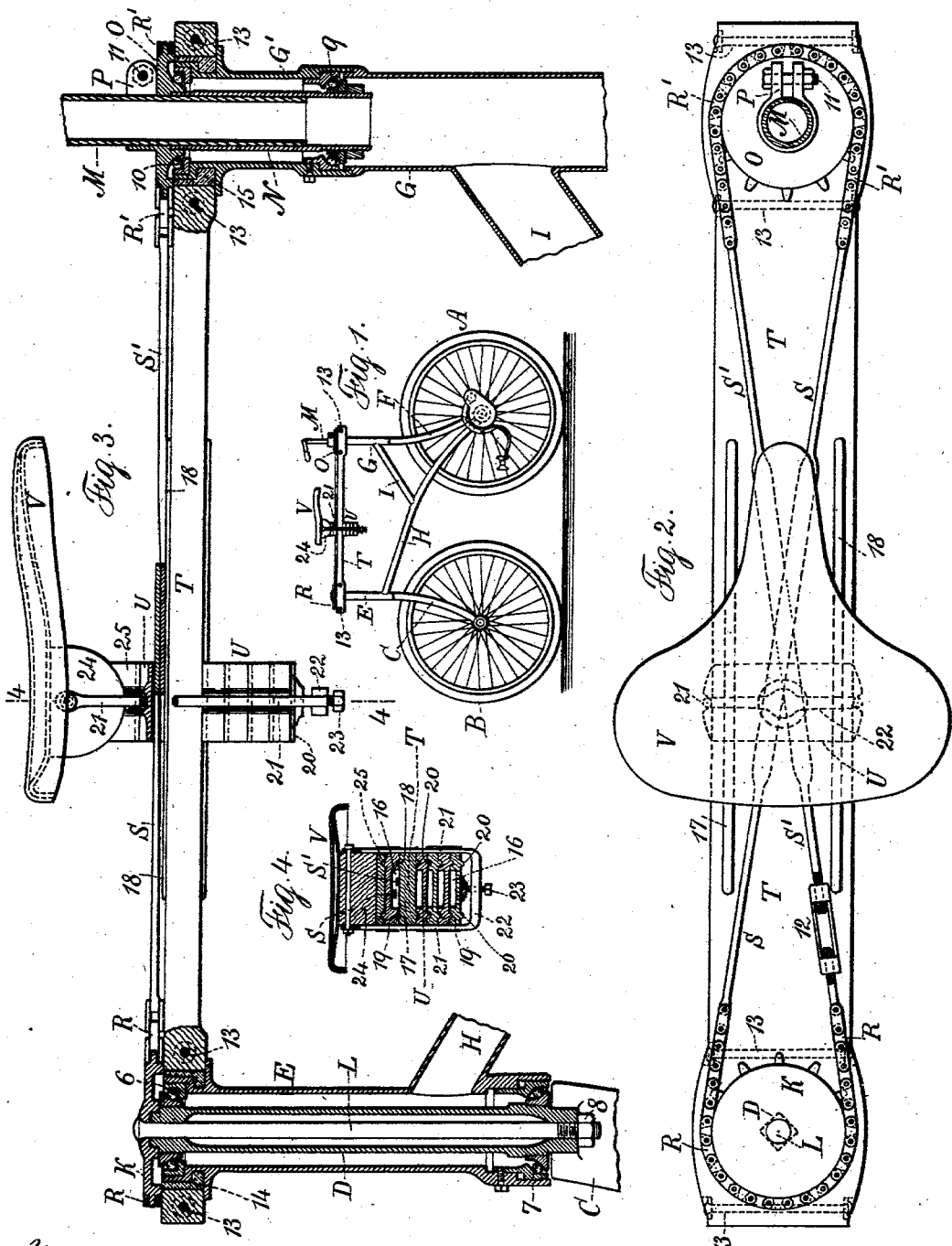

ANSON P. STEPHENS, OF NEW YORK, N. Y.

STEERING MECHANISM FOR CYCLES.

SPECIFICATION forming part of Letters Patent No. 629,179, dated July 18, 1899.

Application filed December 27, 1897. Serial No. 663,487. (No model.)

*To all whom it may concern:*

Be it known that I, ANSON P. STEPHENS, a citizen of the United States, residing in the city and State of New York, have invented a new and useful Improvement in Steering Mechanism for Cycles, of which the following is a specification.

Bicycles have usually been provided with a front fork and steering mechanism, and in some instances the rear wheel has been employed to steer the cycle. I find it advantageous to mount the rear wheel so that it may trail and follow behind the front and driving wheel with little or no attention from the rider, and by connecting the rear steering-wheel to the handle-bar in front the rider is enabled to steer with great ease and reliability, especially as the movement given to the rear wheel in steering acts in a manner similar to the rudder of a vessel and tends to carry the rear of the cycle to the outer side of the curve that is described, and in so doing the weight of the rider is thrown inward and less effort is required to maintain the proper balance while the cycle is passing around a curve.

In carrying out this invention the steering-post upon the fork at the rear is received into a socket-tube, and there is a sprocket-wheel upon the upper end of the steering-post and a similar sprocket-wheel upon the handle-bar stem. The parts are supported by ball-bearings and cross-rods, and connecting-chains passing around the respective sprocket-wheels transmit motion from the handle-bar stem to the steering-post. The frame is made with a strip-perch between the socket-tube and the front frame-tube, upon which perch the saddle is supported, and the parts are constructed with reference to the rods of the steering apparatus passing beneath the saddle-support.

In the drawings, Figure 1 is a diagram illustrating the cycle. Fig. 2 is a plan view. Fig. 3 is a vertical longitudinal section, and Fig. 4 is a cross-section at the line 4.

The front wheel A and rear wheel B are of any desired character, and the propelling device froms no part of the present invention; but such propelling device should be applied to the front wheel. The fork C and the steering-post D are of usual character, except as hereinafter stated, and the socket-tube E is at the rear of the frame, the frame-post being of any desired character, preferably with a front fork F and vertical tube G, and the lower frame-tube H and diagonal tube I connect the socket-tube and the vertical tube in forming the frame.

Ball-bearings of suitable character are provided at 6 and 7 around the steering-post D and within the socket-tube E for supporting the steering-post and allowing the same and the fork C and rear wheel B to be turned with freedom, and in consequence of the fork C being curved downward and to the rear the wheel B trails behind the machine, and the tendency of the movement is to keep the two wheels in the same plane. Thereby little power is required in holding the handle-bars when the cycle is on a straight track. The upper end of the steering-post D is preferably made polygonal to receive the sprocket-wheel K, and the bolt L is used to hold the sprocket-wheel to the top of the steering-post, and it is advantageous to place the nut S at the bottom of the steering-post and between the forks, so as to avoid projections above the sprocket-wheel K.

The handle-bar is to be of any desired character and is not represented in the drawings. The handle-bar stem M passes down into the tube G, and the ball-bearings 9 and 10 surround the socket-tube N, that receives the handle-bar stem M, and these ball-bearings are to be constructed in any suitable manner; but it is advantageous to have the hub of the sprocket-wheel O supported by the upper ball-bearing 10, and this hub is shown as connected to the socket-tube N, and the clamp P surrounds the handle-bar stem and is advantageously integral with the sprocket-wheel O, such clamp being divided at one side and having a screw or bolt 11, by which the sprocket-wheel O is firmly connected to the handle-bar stem M.

It is advantageous to make the sprocket-wheels K and O similar and to have suitable chains passing around such sprocket-wheels, as shown at R R', and these are connected by the steering-rods S S', and a turnbuckle 12 is advantageously applied in one of the rods for tightening the parts and compensating wear, and these steering-rods advantageously cross each other and are flattened in the middle portions where they cross, so as to avoid the rubbing action of one rod upon the other and in order that the steering can be effected when moving the handle-bar, as now usual, because the rear steering-wheel has to be moved in the opposite direction to a front steering-wheel in guiding the cycle. It will be observed that in consequence of the section G' of the vertical tube G being screwed upon said tube G access is given for introducing the ring of the lower ball-bearing 9 and for separating the parts whenever necessary.

To connect the upper ends of the socket-tube E and vertical tube G', I make use of the perch T. It is advantageously made of spring-wood, such as hickory, with eyes at the ends surrounding the respective tubes E and G', and the bolts 13 passing through the wood at opposite sides of the eyes prevent the wood spreading at such eyes, and the eyes themselves are made larger than the exterior diameters of the respective tubes in order that the rubber rings 14 15 may be introduced into such eyes and lessen concussion to the rider, the saddle itself being supported by the perch. The steering-rods S S' should lie as close to the surface of the perch T as convenient, and the saddle-blocks U are recessed on one side, as at 16, so as to rest upon the perch T, with the steering-rods passing through the recess, and to hold the saddle-blocks from lateral motion ribs 17 18 are provided upon the perch T and grooves 19 in the saddle-blocks setting against these ribs, and there are also ribs 20 upon the saddle-blocks themselves engaging the grooves of the adjacent saddle-blocks, and it is advantageous to provide a number of these saddle-blocks and to provide ribs on both the top and bottom surfaces of the perch, so that the desired number of saddle-blocks can be introduced above the perch and the remainder below the perch, thereby providing for raising and lowering the saddle, and in order to connect the saddle V in position the tie-rods 21 are pivoted at their upper ends to the saddle-base and pass through grooves or holes in the ends of the saddle-blocks U to the cross-bar 22 below the lowest saddle-block, and the bolt 23 serves to tighten the parts, and it is advantageous to provide a segmental bearer 24 upon the under side of the saddle-base, engaging the concave bearer 25 above the upper saddle-block U. By this construction the inclination of the saddle-bearer and saddle can be regulated. The height of the saddle-bearer and the saddle-support does not interfere with the steering-rods that pass beneath the saddle, and the weight of the person is taken upon the perch, which is free to spring more or less in consequence of the rubber rings 14 15 without altering the tension of the steering-rods and without straining the frame of the cycle, and it will be apparent that the various parts of the steering mechanism can be taken apart with facility for cleaning or oiling, and such parts are very strong and durable.

In this improvement the weight of the rider is nearly uniformly taken by the front and rear wheels, because the saddle can be moved along upon the perch T to the desired position, and in consequence of the driving mechanism being applied to the axle of the front wheel the movements of the feet in giving motion to such front wheel are entirely in front of the rear wheel, so that the latter can be turned in steering without the feet coming into contact therewith even when the rear steering-wheel is closely adjacent to the front driving-wheel, and for this reason the cycle can be made very compact and lighter and stronger than cycles of this general class as heretofore constructed.

I do not limit myself to any particular construction of driving mechanism, as cranks can be applied to the axle of the front wheel, or any suitable speed-gearing can intervene between the cranks or foot-levers and the axle of the front wheel.

The cross steering-rods insure the proper turning movement of the steering-wheel regardless of the means made use of in connecting the ends of the rods with the steering-head and the handle-bar, respectively.

I claim as my invention—

1. The combination with the front driving-wheel and rear steering-wheel, of a frame receiving and supporting the front wheel, a fork and steering-post for the rear wheel, a socket-tube on the frame for the steering-post, a handle-bar stem, sprocket-wheels upon the steering-post and handle-bar stem respectively, chains for the sprocket-wheels and crossing connections for such chains, a flat perch extending from the upper part of the vertical tube receiving the handle-bar stem, to the socket-tube and immediately below the crossing connections for the chains, a saddle and a support between the same and the perch, said support being recessed on the under side for the passage of the crossing connections for the chains, substantially as set forth.

2. The combination with the front driving-wheel and rear steering-wheel, of a frame receiving and supporting the front wheel, a fork and steering-post for the rear wheel, a socket-tube on the frame for the steering-post, a handle-bar stem, sprocket-wheels upon the steering-post and handle-bar stem respectively, chains for the sprocket-wheels and crossing connections for such chains, a flat perch extending from the upper part of the vertical tube receiving the handle-bar stem to the socket-tube and immediately below the crossing connections for the chains, a saddle and a support between the same and the perch, said support being recessed on the under side for the passage of the crossing connections for the chains, saddle-blocks and rods extending from the saddle-bearer and at the sides of the perch and passing below the saddle-blocks whereby the height of the saddle can be varied by changing the positions of the saddle-blocks, substantially as set forth.

3. The combination with the front driving-wheel and rear steering-wheel, of a frame receiving and supporting the front wheel, a fork and steering-post for the rear wheel, a socket-tube on the frame for the steering-post, a handle-bar stem, a sprocket-wheel thereon and a sprocket-wheel upon the steering-post, chains for the sprocket-wheels and crossing connections for such chains for guiding the steering-wheel by the handle-bar, a perch extending from the upper part of the vertical tube receiving the handle-bar stem adjacent to the surface of which the chains and crossing connections pass, a saddle-block resting on the perch and recessed for the passage of the connections of the steering-chain, a saddle resting upon the blocks and tie-rods for securing the parts in position, substantially as set forth.

4. The combination with the steering-wheel, fork and steering-post, of a frame having a socket-tube at the rear for the steering-post and a tube at the front, a handle-bar stem and a socket into which the handle-bar stem passes, and which socket-tube passes into the front tube, and a sprocket-wheel around the socket-tube and secured thereto, a sprocket-wheel connected to the upper end of the steering-post, chains around the respective sprocket-wheels, and steering-rods connecting the ends of the chains and crossing one below the other and flattened in their middle portions so as to allow the movements of the steering-rods by the handle-bar and sprocket-wheel with little or no friction one upon the other, substantially as set forth.

5. The combination with the rear steering-wheel, fork and steering-post, of a frame having a socket-tube at the rear and a vertical tube at the front ball-bearings between the steering-post and socket-tube, a handle-bar stem and a socket-tube for the same, ball-bearings between the socket-tube and the vertical tube, a sprocket-wheel at the upper end of the socket-tube and a clamp for holding the handle-bar stem, a sprocket-wheel upon the upper end of the steering-post, chains passing around the sprocket-wheels and steering-rods flattened in their middle portions in crossing each other and a turnbuckle for tightening the sprocket-chains and a perch extending from the socket-tube of the steering-post to the front vertical tube of the frame, a saddle above the perch and movable saddle-blocks resting upon the perch and recessed for the passage of the steering-rods, tie-rods and a cross-bar for holding the saddle-blocks in position, substantially as set forth.

6. The combination with the handle-bar stem and its socket-tube, of the frame-tube G and the tube-section G′ screwed upon the same, the external ball-bearing ring received and secured between said tubes G and G′ and the internal ball-bearing ring secured upon the socket-tube, and the intervening balls and a ball-bearing around the upper portion of the socket-tube, substantially as set forth.

7. The combination in a cycle with the frame and driving-wheel, of a steering-wheel, fork and steering-post for the same passing through the socket-tube of the frame, a bar forming a perch extending from the socket-tube to the vertical tube of the frame, and a saddle supported by such perch, and rubber washers within eyes at the ends of the perch, substantially as set forth.

Signed by me this 22d day of December, 1897.

ANSON P. STEPHENS.

Witnesses:
GEO. T. PINCKNEY,
S. T. HAVILAND.